Feb. 23, 1937.  S. S. VARKAS  2,071,991
CLUTCH MECHANISM
Filed Sept. 29, 1931  2 Sheets-Sheet 2
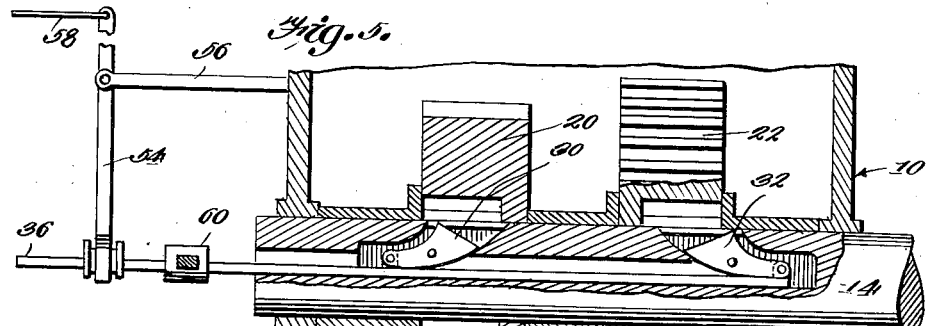
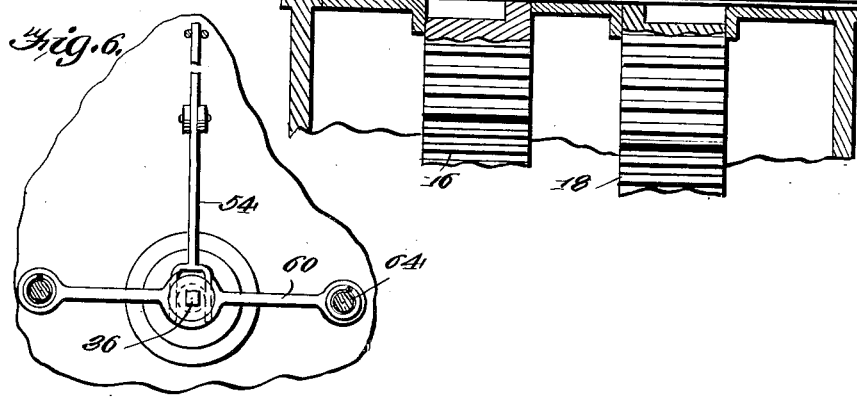
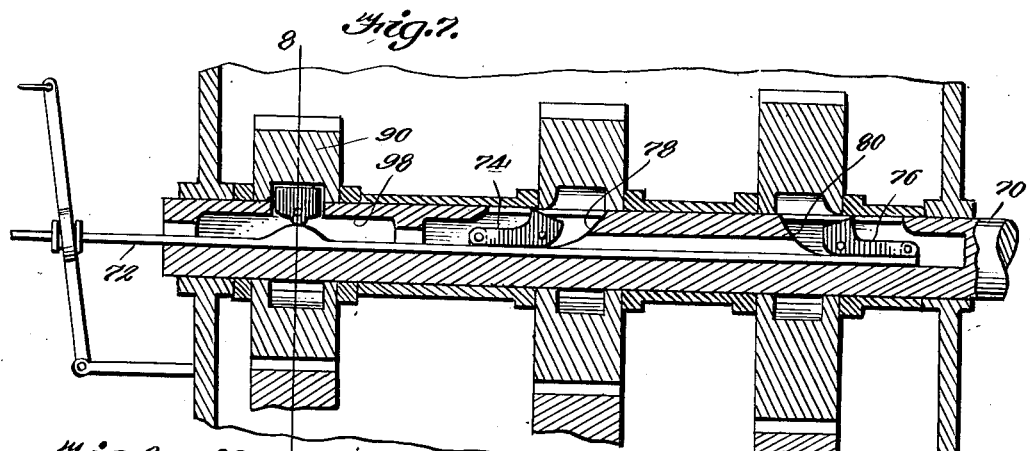
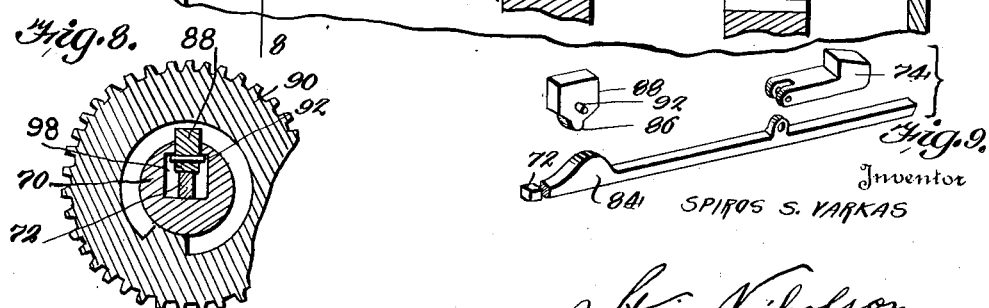
Inventor
SPIROS S. VARKAS
Attorney Patented Feb. 23, 1937

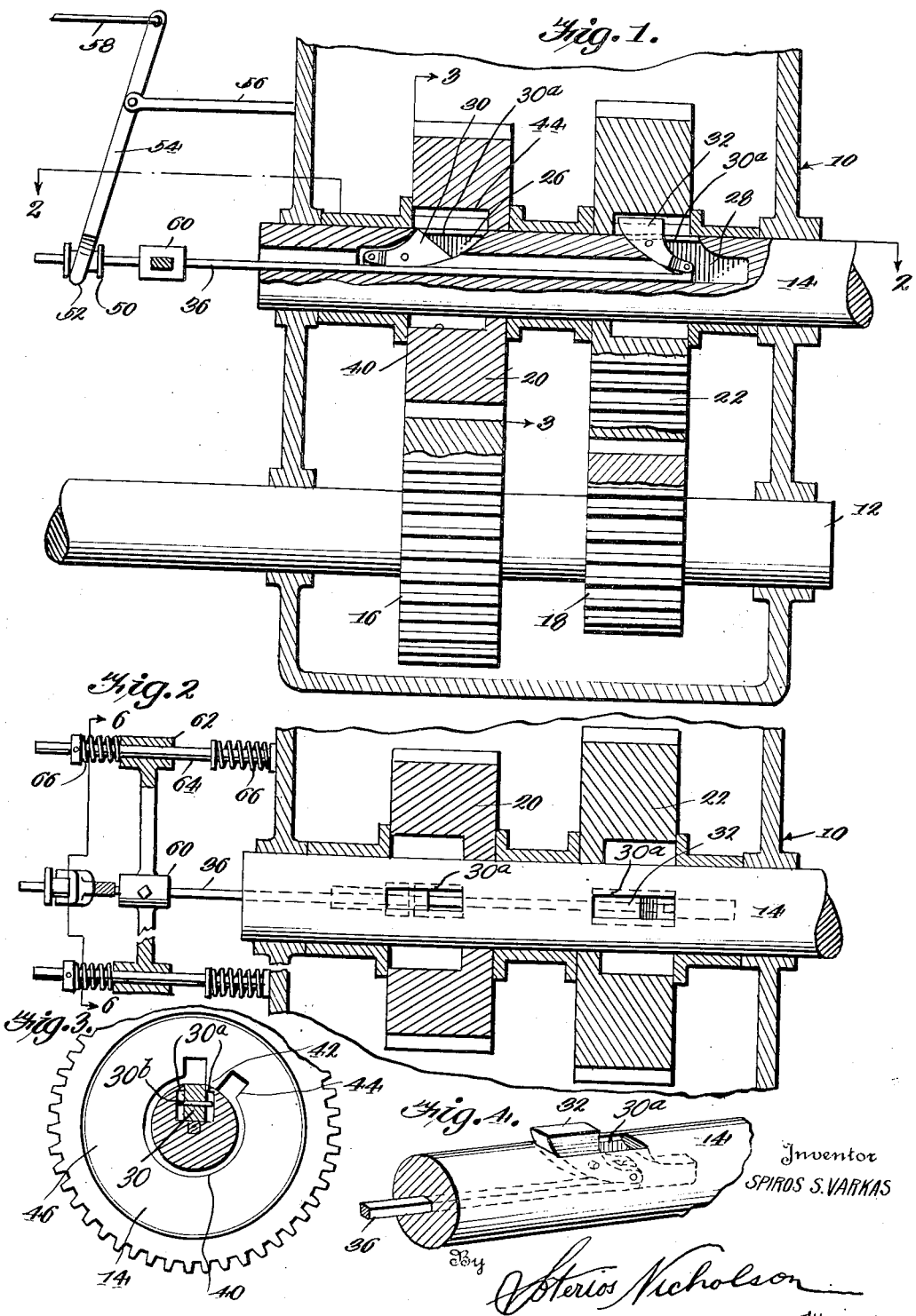

2,071,991

UNITED STATES PATENT OFFICE 2,071,991

CLUTCH MECHANISM

Spiros S. Varkas, New York, N. Y.

Application September 29, 1931, Serial No. 565,835

2 Claims. (Cl. 192—71)

This invention relates to a clutch mechanism which is especially adapted for use in connection with a speed changing device of the type in which a plurality of intermeshing gears are employed.

One of the important objects of the present invention is the production of a simple and efficient clutch mechanism which may be so operated as to provide an efficient connection between a motion transmitting shaft and the gears mounted thereon, whereby the gears may be locked in engagement with the shaft while the parts are in motion.

A further object of this invention is the production of a simple and efficient clutch mechanism embodying means for actuating certain pawls for moving the pawls to an advanced or a retracted position whereby gears carried by a shaft may be locked in engagement with the shaft even while the shaft is in motion.

Other objects and advantages of the present invention will appear throughout the following specification and claims.

In the accompanying drawings forming a part of this application and in which like numerals are employed to designate like parts throughout the same:

Figure 1 is a fragmentary longitudinal sectional view through a speed change mechanism or transmission embodying the invention, one of the motion transmitting pawls being in advanced position while the other pawl is retracted.

Figure 2 is a longitudinal sectional view taken on line 2—2 of Figure 1, the view being taken in the direction of the arrow.

Figure 3 is a detail transverse sectional view taken on line 3—3 of Figure 1.

Figure 4 is a fragmentary perspective view of a shaft with one of the motion transmitting keys in advanced position, the view also illustrating the control rod for the key.

Figure 5 is a fragmentary longitudinal sectional view through the transmission with the motion transmitting keys in retracted or neutral position.

Figure 6 is a fragmentary transverse sectional view taken on line 6—6 of Figure 2.

Figure 7 is a fragmentary longitudinal sectional view through a modified form of invention.

Figure 8 is a detail transverse sectional view on line 8—8 of Figure 7.

Figure 9 is a fragmentary group perspective illustrating the adjusting rod and associated keys disclosed in Figure 7.

In the drawings the numeral 10 designates a transmission casing having a plurality of shafts 12 and 14; for the purpose of this description it might be assumed that the member 12 is the drive shaft while the member 14 is the driven shaft.

As in the case of a conventional speed change mechanism of the type employing intermeshing gears, the shaft 12 is provided with spur gears 16 and 18 in constant mesh with similar gears 20 and 22 respectively mounted on the driven shaft 14. Of course, the gears 16 and 18 are keyed or otherwise permanently secured on the shaft 12 to turn therewith and when the drive is through the intermeshing gears 16 and 20 the ratio of the shafts 12 and 14 will differ from that prevailing when the drive is through the gears 18 and 22.

Attention is especially invited to Figure 1 in which it is illustrated that the shaft 14 is provided with a pair of curved grooves or slots 26 and 28, the bottom walls of which are curved to form cam surfaces against which arcuate and gradually widening keys 30 and 32 contact.

The keys 30 and 32 are pivotally connected at the reduced inner ends thereof to a longitudinally movable adjustment rod 36 and it is believed to be clear that endwise movement of the rod 36 toward the left to the position shown in Figure 1 will bring about the advancement of the pawl 32 and the retraction of the pawl 30.

The gears 20 and 22 are each formed in the hub portion thereof with an arcuate recess or opening 40, the end of which is defined by an inwardly directed radial lug 42. As shown in Figure 3, the inwardly directed radial lug 42 is tapered toward the inner end thereof and constitutes the adjacent side walls of slots 44, these slots opening into the arcuate recess 40 and being adapted for the reception of the associated arcuate key. Obviously, advancement of one of the keys, for example the key 30, into one of the slots 44 will establish a driving connection between the shaft 14 and the gear 20.

With further reference to Figure 3, it will be seen that the lug 42 forms what might be said to be the inner side walls of the slots 44. The presence of the lug 42 has the effect of providing an increased area of contact between the keys and the gears to the end that shearing of the keys is rendered less likely. The sockets 26 and 28 are each provided with ribs 30ª located on opposite sides of the mouth of each socket and a cross pin 30ᵇ is carried by each of the keys 30 and 32, the pins 30ᵇ being engageable with the ribs 30ª to limit protrusion of the keys 30 and 32.

The arcuate recess 40 is in constant registration or alignment with the contiguous key receiving socket in the shaft so that the same is, at all times, located to freely receive the adjacent key. Entrance of the key into the associated annular groove 40 is followed by contact of the key with the lug 42 and the lug, in turn, directs the key into one of the slots 44 so that a motion transmitting connection may be established between one of the keys and the associated gear regardless of the speed of the gears or the shaft and without disturbing the interengagement of the gears.

At this point, it might be noted that the invention herein disclosed provides for the constant meshing of the gears and thus the clashing of gears as a result of the engagement and disengagement of the same is completely avoided.

The operating rod 36 is shown to be provided at the outer end thereof with a spool-like member 50 engaged by the bifurcated lower end portion 52 of a lever 54. The intermediate portion of the lever 54 is fulcrumed to a bracket 56 and has connection at one end with a speed change link 58. The link 58 may extend from a suitable point of control such, for example, as a lever or foot pedal.

As shown in Figures 1 and 2, the adjusting rod 36 has rigid connection at what might be said to be the outer end portion thereof with a cross head 60 the terminal portions of which are formed with sleeve-like members 62 movable on fixed rods or stems 64 and disposed between expansion springs 66. The outer ends of the expansion springs 66 are held against movement with respect to the arms or stems 64 while the opposed ends of the springs 66 are movable so that the springs may yield under the influence of the cross head.

The arrangement of the cross head 60, the arms 64 and the expansion springs 66 normally hold the adjusting rod 36 and the keys 30 and 32 in a neutral position.

More specifically, the springs 6 act to constantly urge the cross head 60 to an intermediate position so that the motion transmitting keys 30 and 32 will occupy the retracted positions shown in Figure 5. In this figure, it is shown that the motion transmitting keys 30 and 32 may be positioned entirely within the sockets 26 and 28 to interrupt the driving connection between the shaft 14 and the motion transmitting gears mounted thereon.

Of course, in carrying out the invention suitable means may be employed to lock the rod 36 in a set position until such time as it is intentionally released so that the desired ratio between the shaft 12 and the shaft 14 may be provided as long as is desired or required.

It is entirely within the purview of this invention to provide for the reversal of the shaft 14 through the employment of additional or intermediate gears or in any manner desired.

In the form of the invention illustrated in Figures 7, 8, and 9 the motion transmitting shaft 70 is longitudinally bored for the reception of an adjustment rod 72 and keys 74 and 76 are pivoted at the inner ends thereof to the rod 72 so that endwise movement of the rod will bring about the advancement of one of the pawls and the retraction of the other pawl or in the retraction of both of the pawls to a neutral position.

As shown in Figure 7, the pawls or keys 74 and 76 are of L-shaped formation and have the outer edges thereof slightly rounded for contact with the curved and cam lower faces 78 and 80 of the key receiving sockets in the shaft.

The rod 72 is shown to be provided with a fixed cam 84 having oppositely inclined walls for engagement with the rounded knob 86 formed on the lower portion of a key 88. Endwise movement of the rod 72 in the desired direction brings about either the advancement or retraction of the key 88 with respect to the associated gear 90, and this, of course establishes or interrupts the driving connection between the gear 90 and the shaft 70. As shown in Figure 8, the key 88 is provided with a pin 92 projecting beyond opposite sides of the key and received within the adjacent socket 98 of the shaft.

Having thus described the invention, what is claimed is:

1. In a clutch of the class described, a shaft having a socket, a movable motion transmitting key in said socket, said socket having ribs on opposite sides at its mouth and the key being provided with a cross pin engageable with the ribs to limit protrusion of the key, a rotary member on said shaft and having an arcuate recess for registration with said socket, said rotary member being provided with a pair of slots at the ends of said arcuate recess, said slots being adapted for the reception of said key, and a positioning device for said key.

2. In a clutch of the class described, a shaft having a socket, a key in said socket, said socket having ribs on opposite sides at its mouth and the key being provided with a cross pin engageable with the ribs to limit protrusion of the key, a rotary member on said shaft and being provided with an arcuate recess in register with said socket, and being provided with a lug forming the ends of said arcuate recess, said rotary member being provided at opposite sides of said lug with key receiving slots.

SPIROS S. VARKAS.